Figure 1:
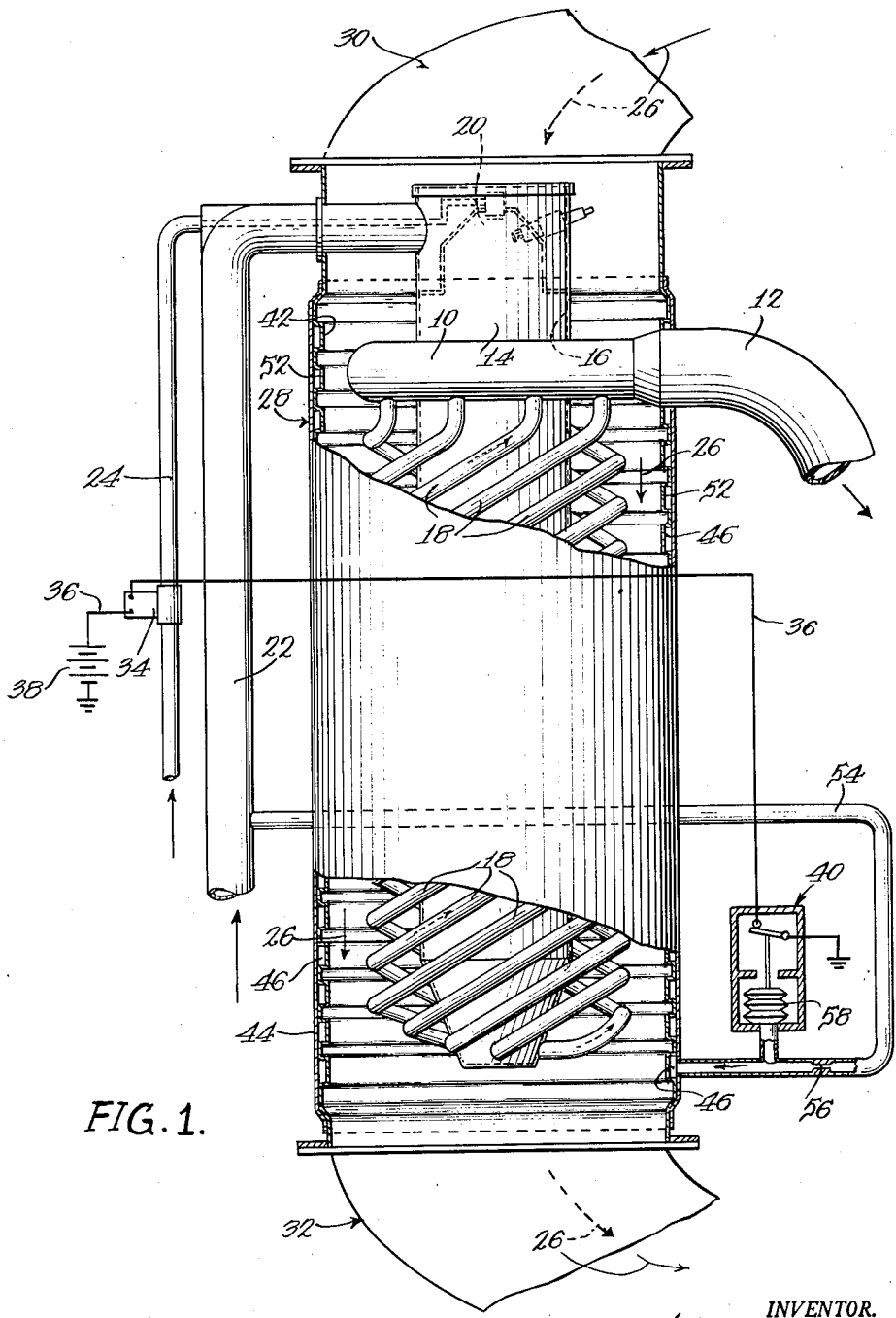

Feb. 2, 1960

J. R. BURTT 2,923,288

SAFETY COMBUSTION APPARATUS FOR AIRCRAFT

Filed Dec. 3, 1956

2 Sheets-Sheet 1

INVENTOR.
Jack R. Burtt
BY
Ahlberg, Wupper & Gradolph
Attys.

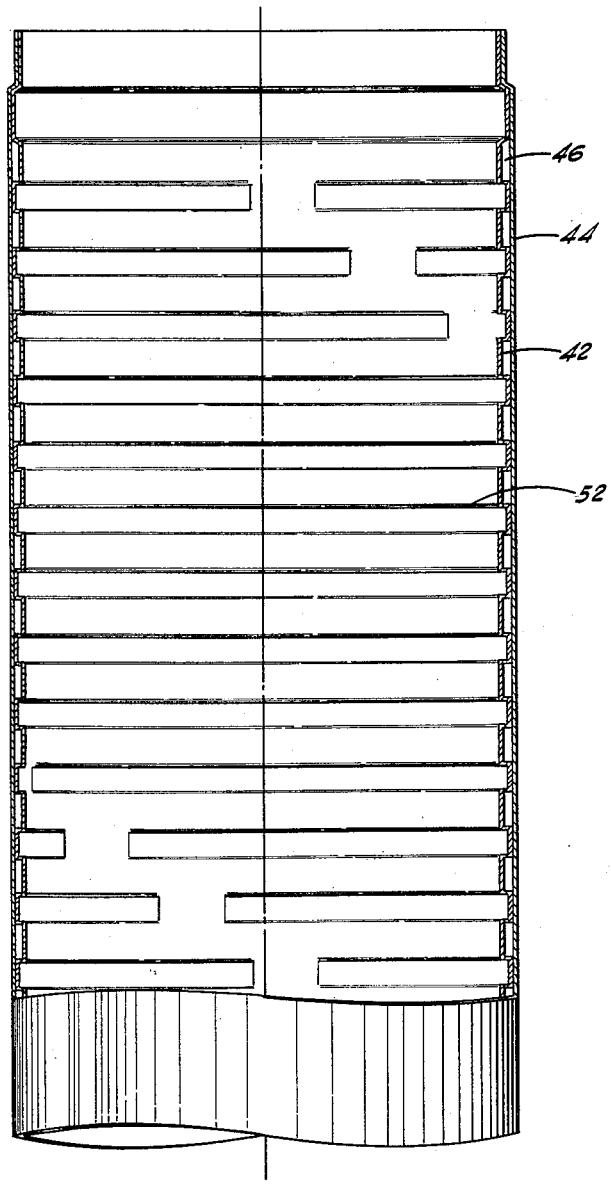

United States Patent Office 2,923,288
Patented Feb. 2, 1960

2,923,288
SAFETY COMBUSTION APPARATUS FOR AIRCRAFT

Jack R. Burtt, Indianapolis, Ind., assignor to Stewart-Warner Corporation, Chicago, Ill., a corporation of Virginia Application December 3, 1956, Serial No. 625,848

2 Claims. (Cl. 126—116)

The present invention relates to combustion apparatus used in aircraft to burn fuel in air to provide inert gas for purging fuel spaces or to provide heat for space heating purposes. The size and weight limitations on aircraft accessories require that such combustion apparatus be of compact, lightweight construction. Hence, high stressed operation of the apparatus is required to meet the large output requirements of this service. This produces very high operating temperatures which under certain abnormal conditions can burn through the lightweight structure of the apparatus to create a serious fire hazard. Moreover, combustion apparatus installed on military planes is subject to rupture by projectiles, thus creating additional fire hazards.

One object of the invention is to provide aircraft combustion apparatus of the above character having an improved lightweight construction which effectively eliminates the hazards of fire escaping through any breaks which may occur in structure encompassing the zones of highest temperature within the apparatus.

Other objects and advantages will become apparent from the following description of the exemplary embodiment of the invention in which: Fig. 1 illustrates partially in section the improved combustion apparatus; and Fig. 2 shows an enlarged section of the plenum chamber illustrating the intercommunication of corrugations.

The illustrated embodiment of the invention constitutes the combustion section of a more complex purge gas system installed in an airplane (not shown) to prevent burning of fuel vapors in fuel cells and other enclosed spaces within the aircraft. The ignition of the vapor is prevented by introducing inert gas into the aircraft spaces in quantities sufficient to produce a noncombustible atmosphere. The general construction and manner of use of such purge gas systems are well known in the art and, as such, do not require specific disclosure here.

A most suitable source of inert gas for use in purging aircraft spaces subject to contamination by fuel vapor is burned combustion gases. Such gases are prepared for this purpose by purification apparatus which usually cools, dries, and cleans the gases prior of distribution to the aircraft spaces. Purification structure designed specifically for this purpose is disclosed in U. S. Patent No. 2,753,950 issued July 10, 1956, to C. R. Baker, et al.

As incorporated into a purge gas system, the illustrated combustion assembly provides a precooled supply of burned combustion gas for purification by apparatus of the character shown in the previously mentioned Baker Patent No. 2,753,950. Having reference to the drawing in the present application, burned combustion gases are collected by an arcuate exhaust manifold 10 and directed through a duct 12 to coacting purifying apparatus (not shown) of the character disclosed by the Baker et al. Patent No. 2,753,950.

The exhaust manifold 10 embraces one end of a hollow sheet metal barrel 14 defining in the interior of the barrel an elongated combustion chamber 16. This combustion chamber 16 is connected to the exhaust manifold 10 by a multiplicity of helical return tubes 18 extending along and around the barrel 14 in radially spaced relation thereto from the manifold 10 to the more remote end of the barrel.

A burner 20 is mounted in the end of the barrel 14 more nearly adjacent the exhaust manifold 10 to discharge combustible gases into the combustion chamber 16. An air supply line 22 connected to the burner 20 is supplied with air under a pressure of approximately 38 pounds per square inch gauge by means of conventional regulator structure (not shown), which bleeds air from the compressor stage of the main gas turbine propulsion engines of the aircraft.

Fuel is supplied to the burner 20 through a fuel line 24 extending into the burner through the burner end of the air supply line 22.

The zones of highest temperature are contained within the combustion chamber 16, the return tubes 18, and the exhaust manifold 10. This structure is cooled normally by a stream of air, indicated by the arrows 26, moving longitudinally through a cylindrical jacket 28 encircling the manifold 10 and the return tubes 18 in radially spaced relation to the latter and extending beyond opposite ends of the barrel 14. An air inlet 30 connecting with the burner end of the jacket 28 is supplied with air from conventional scoop structure (not shown) on the airplane. An air outlet 32 connecting with the opposite end of the jacket 28 directs the outflowing air to a suitable discharge point.

As previously intimated, minimization of the size and weight of the combustion apparatus, a paramount requisite for all aircraft accessories, necessitates high stressed operation of the apparatus at the highest tolerable temperatures for the jacket 28 and the heated structure encircled by the jacket. The extremely high operating temperature of this structure unavoidably makes it susceptible to failure in the event of operational abnormalities tending to elevate the temperature even further. A structural failure from overheating or from any other cause such as rupture of the jacket 28 by projectiles in military service creates a serious hazard of fire escaping from the zones of highest temperature through the jacket 28.

Recognizing that mere strengthening of the jacket 28 with attendant increases in the weight of the entire assembly is not an acceptable solution of this problem, the present invention overcomes this fire hazard by means of an improved lightweight construction which operates automatically in the event of an incipient break in the jacket 28 to abruptly shut off the burner 20 before fire has had an opportunity to escape through the jacket.

To abruptly terminate combustion at the burner 20, an electrically operated cutoff valve 34 is placed in the fuel supply line 24. Preferably the electrically operated valve 34 is designed to close the fuel line 24 upon deenergization of an electrical circuit 36 extending through the valve from a voltage source 38 to a control switch 40 which is grounded back to the voltage source.

The switch 40 is a pressure responsive switch that is utilized in an extremely efficient manner to trigger a fuel shutoff action of the valve 34 automatically as an incident to an incipient break in the structural integrity of the jacket 28 surrounding the zones of highest temperature within the combustion apparatus.

The jacket 28 is constructed from two lightweight cylindrical elements 42, 44 joined in concentric relation to each other to define within the jacket a thin impervious plenum chamber 46 of generally cylindrical shape encircling the heated structure around the combustion chamber 16 and extending longitudinally beyond the hottest components of the combustion assembly, which include the exhaust manifold 10, return tubes 18, and the portion of the barrel 14 defining the combustion chamber 16.

As shown, the inner cylindrical element or shell 42 extends from the jacket inlet 30 to the outlet 32. The outer envelope 44 has a diameter somewhat in excess of that of the inner shell 42 and encircles the latter substantially from the outlet end thereof to the other end of the envelope 44, which terminates along the inner shell between its inlet end and the exhaust manifold 10.

The marginal edges of the outer envelope 44 are turned radially inward at opposite ends of the envelope and circumferentially attached by brazing or otherwise to the adjacent outer surface of the inner shell 42. Thus sealed at opposite ends to the inner shell 42, the envelope 44 coacts with the shell to form a lightweight impervious construction defining the thin cylindrical plenum chamber 46. As shown, the inner shell 42 is strengthened between opposite ends of the outer envelope 44 by arcuate corrugations 52 formed in the shell in a manner which provides for a free flow of air longitudinally through the plenum chamber 46 sufficient to allow a rapid equalization of pressure throughout the plenum chamber as best shown in Fig. 2. A more detailed disclosure of the preferred construction of the jacket 28 is made in my copending application Serial No. 625,849 filed December 3, 1956 and entitled "Pneumatic Jacket for Aircraft Combustion Apparatus," now Patent No. 2,878,837, granted March 24, 1959.

In operation the plenum chamber 46 is charged with air under pressure above a predetermined substantial level. For this purpose the air supply line 22, which as previously mentioned is normally supplied with air under a pressure of approximately 38 pounds per square inch gauge, is connected through a conduit 54 to the plenum chamber 46. The flow of air through the conduit 54 into the plenum chamber 46 is limited to a rather small maximum rate by flow restriction means 56 formed in the conduit. However, air flowing even at the limited rate through the restriction means 56 into the plenum chamber quickly charges the plenum chamber to a pressure equal to that in the supply line 22.

The pressure responsive switch 40 shown for the purpose of illustration comprises a bellows 58 which is connected to the conduit 54 between the restriction means 56 and the plenum chamber 46. Thus the bellows 58 communicates with the plenum chamber 46 to respond to the air pressure within the chamber as distinguished from the pressure which may exist in the conduit 54 between the restriction 56 and the air supply line 22. It will be understood, of course, that any suitable pressure responsive switch may be utilized in the present invention.

The bellows 58 is designed to open the switch 40 thus triggering closure of the fuel valve 34 automatically in response to a decrease in the pressure within the plenum chamber 46 below a predetermined value somewhat less than the normal pressure to which the plenum chamber is charged by air from the conduit 54.

When the apparatus is put into operation the flow of air through the conduit restriction means 56 from the supply line 22 soon charges the plenum chamber 46 to a pressure level in excess of that at which the pressure responsive switch 40 closes to open the fuel valve 34. In flight, this static condition is maintained so long as there is no impairment in the structural integrity of either the envelope 44 or the inner jacket shell 42 defining the plenum chamber 46.

However, in the event of an incipient break in the portion of the inner shell 42 directly exposed to the hottest structure within the combustion apparatus, air immediately escapes through the break from the plenum chamber 46. If the size of the break in the inner shell is of any consequence, the rate of escape of air through the break from the plenum chamber 46 will exceed the rate of entry of additional air through the air restriction 56 in the supply conduit 54. As a consequence, the pressure in the plenum chamber 46 quickly drops below the level at which the switch 40 opens to trigger closing of the fuel valve 34. This shuts off the fire at the burner 20 quickly and automatically before it has an opportunity to escape through the outer envelope 44.

A similar safety action is produced automatically as the result of rupture by flying projectiles or the like of either the outer envelope 44 or the inner shell 42 surrounding the high temperature zones within the apparatus. Thus the hazard of fire escaping through the jacket 28 is virtually eliminated while at the same time preserving the essential lightweight character of the construction.

While I have shown a preferred embodiment of my invention, it will be apparent that numerous variations and modifications thereof may be made without departing from the underlying principles and scope of the invention. I therefore desire, by the following claims, to include all such variations and modifications by which substantially the results of my invention may be obtained through the use of substantially the same or equivalent means.

I claim:

1. In combination with combustion apparatus of the type in which a burner injects an ignited combustible mixture into a combustion chamber and in which the gaseous products of combustion flow from the combustion chamber to an outlet connected in fluid conducting relationship with the combustion chamber, safety apparatus comprising a first thin metallic shell substantially encircling the combustion apparatus, a second thin metallic shell encircling the first shell and joined circumferentially thereto at two longitudinally spaced locations thereon to define therewith an impervious plenum chamber offering low resistance to fluid flow therein, one of the shells including a series of longitudinally spaced arcuate depressions each extending circumferentially around a substantial portion of the surface of the one shell and projecting toward the other shell, the nondepressed sections of the one shell lying between opposite ends of each depression being circumferentially shifted sequentially to provide a generally helical fluid passageway between the elements traversing the series of arcuate depressions and communicating with both ends of the spaces formed between successive pairs of depressions, a source of high pressure fluid, restricted passageway structure interconnecting the plenum chamber and the source to maintain the internal fluid pressure of the plenum chamber above a predetermined pressure level only so long as the plenum chamber remains substantially leakproof, a device for rendering the combustion apparatus ineffective, and a fluid pressure responsive device connected in unrestricted fluid conducting relationship with the plenum chamber responsive to plenum chamber pressure below said predetermined level for causing the device to render the combustion apparatus ineffective.

2. In combination with combustion apparatus of the type in which a burner injects an ignited combustible material into a combustion chamber, in which gaseous products of combustion flow from the combustion chamber to an outlet connected in fluid conducting relationship with the combustion chamber, and in which a thin temperature resistant metallic element substantially encloses the apparatus, safety apparatus comprising: a second thin temperature resistant metallic element disposed adjacent the first-mentioned element, generally encircling the apparatus, and joined circumferentially to the first-mentioned element at two longitudinally spaced locations thereof to define therewith a sealed plenum chamber offering low resistance to fluid flow therein; one of the elements including a series of longitudinally spaced arcuate depressions each extending circumferentially around almost the entire surface of the one element and projecting toward the other element whereby the ends of each arcuate depression are juxtaposed, the nondepressed sections of the one element lying between the juxtaposed ends of each depression being circumferentially shifted sequentially to provide a generally helical plenum chamber passageway between the elements traversing the series of arcuate depressions and communicating with both ends of the plenum chamber spaces formed between successive pairs of depressions; a source of high pressure fluid; restricted passageway structure connecting the source in fluid conducting relationship with the plenum chamber to maintain the internal fluid pressure of the plenum chamber above a predetermined pressure level so long as the plenum chamber remains substantially fluidtight; a device for shutting off the combustion apparatus; and a fluid pressure responsive device connected in unrestricted fluid conducting relationship with the plenum chamber immediately adjacent thereto responsive to a plenum chamber pressure below the predetermined level for causing the device to shut off the combustion apparatus.

References Cited in the file of this patent
UNITED STATES PATENTS

| Number | Name | Date |
|---|---|---|
| 1,090,874 | Pier | Mar. 24, 1914 |
| 1,333,229 | Toles | Mar. 9, 1920 |
| 2,445,466 | Arnhym | July 20, 1948 |
| 2,451,625 | Marshall et al. | Oct. 19, 1948 |
| 2,707,864 | Taylor | May 10, 1955 |
| 2,759,802 | Potter et al. | Aug. 21, 1956 |
| 2,772,860 | Nelson | Dec. 4, 1956 |